United States Patent
Heo et al.

(10) Patent No.: US 10,243,730 B2
(45) Date of Patent: Mar. 26, 2019

(54) APPARATUS AND METHOD FOR ENCRYPTING DATA IN NEAR FIELD COMMUNICATION SYSTEM

(71) Applicants: Samsung Electronics Co., Ltd., Suwon-si, Gyeonggi-do (KR); Korea University Research and Business Foundation, Seoul (KR)

(72) Inventors: Jun Heo, Seoul (KR); Kyoung-Hoon Kwon, Seongnam-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 159 days.

(21) Appl. No.: 15/029,485

(22) PCT Filed: Oct. 16, 2014

(86) PCT No.: PCT/KR2014/009726
§ 371 (c)(1),
(2) Date: Apr. 14, 2016

(87) PCT Pub. No.: WO2015/056990
PCT Pub. Date: Apr. 23, 2015

(65) Prior Publication Data
US 2016/0241385 A1    Aug. 18, 2016

(30) Foreign Application Priority Data
Oct. 17, 2013   (KR) .......................... 10-2013-0124056

(51) Int. Cl.
*H04L 9/06*        (2006.01)
*H04W 12/00*    (2009.01)
(Continued)

(52) U.S. Cl.
CPC ............... *H04L 9/06* (2013.01); *H04W 12/00* (2013.01); *H04W 12/02* (2013.01); *H04L 63/0492* (2013.01); *H04L 2209/805* (2013.01)

(58) Field of Classification Search
USPC .......... 380/28, 255, 264, 276; 726/2, 21, 36; 713/255, 264, 276
See application file for complete search history.

(56) References Cited

U.S. PATENT DOCUMENTS 4,763,331 A  *  8/1988   Matsumoto .......  H03M 13/3723
                                                          714/752
6,147,964 A  *  11/2000  Black .....................  H04B 1/707
                                                          370/209
(Continued)

FOREIGN PATENT DOCUMENTS

EP            2 244 387 A1    10/2010
KR       10-2010-0117051 A    11/2010
(Continued)

OTHER PUBLICATIONS

Wyner; The Wire-Tap Channel; The Bell System Technical Journal; vol. 54; No. 8; Aug. 1975; US.
(Continued)

*Primary Examiner* — Sharif E Ullah
(74) *Attorney, Agent, or Firm* — Jefferson IP Law, LLP

(57) ABSTRACT

A method for encrypting data in a near field communication system is provided. The method includes generating encrypted data based on first data input in a current state and second data input in a state immediately preceding the current state, and encoding the encrypted data through a predetermined error correcting code.

8 Claims, 10 Drawing Sheets

(51) Int. Cl.
 *H04W 12/02* (2009.01)
 *H04L 29/06* (2006.01)

(56) References Cited

U.S. PATENT DOCUMENTS

| 8,347,186 | B1* | 1/2013 | Arikan | H03M 13/13 |
|---|---|---|---|---|
| | | | | 714/774 |
| 8,667,380 | B2 | 3/2014 | McLaughlin et al. | |
| 2005/0071734 | A1* | 3/2005 | Burr | H03M 13/41 |
| | | | | 714/795 |
| 2006/0031737 | A1* | 2/2006 | Chugg | H03M 13/095 |
| | | | | 714/755 |
| 2006/0203943 | A1* | 9/2006 | Scheim | H04L 1/0045 |
| | | | | 375/341 |
| 2008/0219447 | A1* | 9/2008 | McLaughlin | H04K 1/00 |
| | | | | 380/270 |
| 2010/0275093 | A1* | 10/2010 | McLaughlin | H03M 13/033 |
| | | | | 714/752 |
| 2011/0246854 | A1* | 10/2011 | McLaughlin | H03M 13/01 |
| | | | | 714/758 |
| 2013/0028271 | A1* | 1/2013 | Limberg | H04N 21/6112 |
| | | | | 370/479 |
| 2013/0028336 | A1* | 1/2013 | Limberg | H04N 21/2383 |
| | | | | 375/240.27 |
| 2013/0254638 | A1* | 9/2013 | Okamura | H03M 13/116 |
| | | | | 714/786 |

FOREIGN PATENT DOCUMENTS

| KR | 10-2011-0081948 A | 7/2011 |
|---|---|---|
| WO | 2008/036633 A2 | 3/2008 |

OTHER PUBLICATIONS

McEliece; A Public-Key Cryptosystem Based on Algebraic Coding Theory; DSN Progress Report 42-44; Jul. 1978.
Leung-Yan-Cheong et al.; The Gaussain Wire-Tap Channel; IEEE Transactions on Information Theory; vol. IT-24; No. 4; Jul. 1978.
Peleg et al.; On Interleaved, Differentially Encoded Convolutional Codes; Department of Electrical Engineering; Technion—Isreal Institue of Technology; Jun. 1999; Isreal.
Harrison et al.; Stopping Sets for Physical-Layer Security; 2010 IEEE Information Theory Workshop; ITW 2010 Dublin; Aug. 2010; Dublin.
Klinc et al.; LDPC Codes for the Gaussain Wiretap Channel; Apr. 5, 2011.
Baldi et al; Coding with Scrambling, Concatenation, and HARQ for the AWGN Wire-Tap Channel: A Security Gap Analysis; IEEE Transactions on Information Foresnsics and Security; vol. 7, No. 3; Jun. 2012.

* cited by examiner

APPARATUS AND METHOD FOR ENCRYPTING DATA IN NEAR FIELD COMMUNICATION SYSTEM

CROSS-REFERENCE TO RELATED APPLICATION(S)

This application is a U.S. National Stage application under 35 U.S.C. § 371 of an International application filed on Oct. 16, 2014 and assigned application number PCT/KR2014/009726, which claimed the benefit of a Korean patent application filed on Oct. 17, 2013 in the Korean Intellectual Property Office and assigned Serial number 10-2013-0124056, the entire disclosure of which is hereby incorporated by reference.

TECHNICAL FIELD

The present disclosure relates to an apparatus and method for encrypting data in a near field communication system for performing direct communication between devices.

BACKGROUND

In general, a technique for wireless communication over very short distances is referred to as near field communication (NFC). Typically, a device-to-device (D2D) communication for performing direct communication between devices without a repeater is considered a near field communication.

Research on an error correcting code in a physical layer has been conducted in a manner in which, while increasing the reliability of data transmitted between a transmitter and a receiver, the data can be quickly transmitted and also quickly processed. For example, a turbo code is included in an error correcting code. The turbo code is a low-complexity encoding and decoding algorithm, and provides, in an additive white Gaussian noise (AWGN) environment, an error correcting performance close to a theoretical limit of Shannon after only a relatively small number of times of decoding.

The above information is presented as background information only to assist with an understanding of the present disclosure. No determination has been made, and no assertion is made, as to whether any of the above might be applicable as prior art with regard to the present disclosure.

SUMMARY

Since a wireless communication channel between a transmitter and a receiver in a device to device communication is open to everyone, communication security is vulnerable. And, since anyone may acquire data transmitted over the wireless communication channel, there is a great difficulty in detecting and resolving a problem of the presence of a threat to the communication security.

Aspects of the present disclosure are to address at least the above-mentioned problems and/or disadvantages and to provide at least the advantages described below. Accordingly, an aspect of the present disclosure is to provide an apparatus and method for encrypting data in a near field communication system.

Another aspect of the present disclosure is to provide an apparatus and method for encrypting data so as to successfully reconstruct the data by only a predetermined reception terminal in a near field communication system.

Another aspect of the present disclosure is to provide an apparatus and method for reconstructing the encrypted data in a near field communication system.

In accordance with an aspect of the present disclosure, a method for encrypting data in a near field communication system is provided. The method includes generating encrypted data based on first data input in a current state and second data input in a state immediately preceding the current state, and encoding the encrypted data through a predetermined error correcting code.

In accordance with another aspect of the present disclosure, a method for reconstructing encrypted data in a near field communication system is provided. The method includes decoding encrypted data input in a current state through a predetermined error correcting code, and reconstructing the encrypted data input in the current state in consideration of reconstructed data in a state immediately preceding the current state.

In accordance with another aspect of the present disclosure, an apparatus for encrypting data in a near field communication system is provided. The apparatus includes a first encoder configured to generate encrypted data based on first data input in a current state and second data input in a state immediately preceding the current state, and a second encoder configured to encode the encrypted data through a predetermined error correcting code.

In accordance with another aspect of the present disclosure, an apparatus for reconstructing encrypted data in a near field communication system is provided. The apparatus includes a first decoder configured to decode encrypted data input in a current state through a predetermined error correcting code, and a second decoder configured to reconstruct the encrypted data input in the current state in consideration of reconstructed data in a state immediately preceding the current state.

The present disclosure proposes an encoder to which a physical layer security technology is applied, when a wiretap terminal other than a pre-determined legitimate reception terminal exists in a near field communication system, which can reduce the danger of wiretapping by a wiretap terminal. In addition, the present disclosure has an advantage of improving a processing speed of the encoder as well as being able to enhance the reliability and maximize security.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
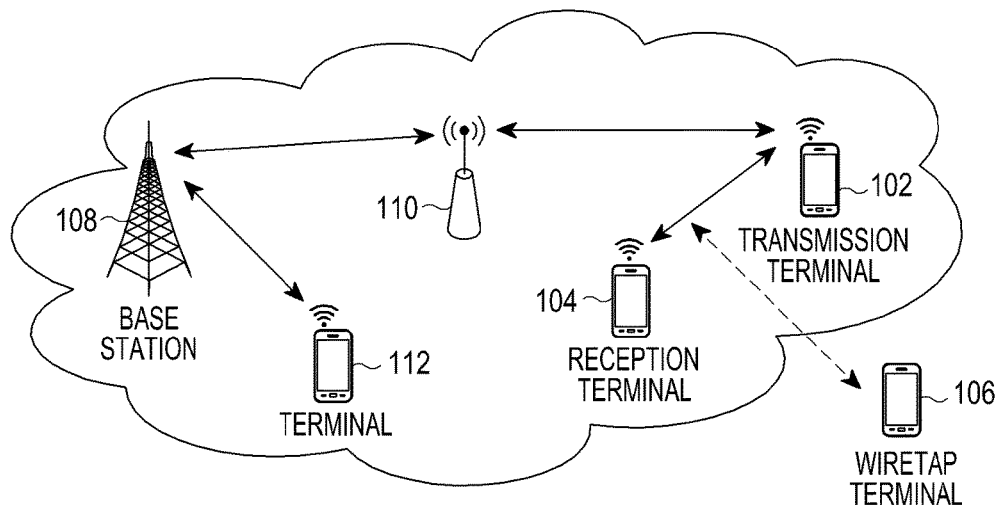
FIG. 1 is a diagram of a cellular communication system to which direct communication between terminals is applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to a "component surface" includes reference to one or more of such surfaces.

Before a detailed description of the present disclosure, it may be effective to set the definition of words and phrases used by the patent document: the words 'include and 'comprise' and their derivatives are meant to be inclusive but not limitative; the term 'or' is inclusive and means 'and/or', and; the phrases 'associated with ~', 'associated therewith ~', and their derivatives may mean 'include', 'be included within ~', 'interconnect with ~', 'contain', 'be contained within ~', 'connect to or with ~', 'couple to or with ~', 'be communicable with ~', 'cooperate with ~', 'interleave', 'juxtapose', 'be proximate to ~', 'be bound to or with ~', 'have', 'have a property of', etc.; the word controller' means any device for controlling at least one operation, system, or portion, and the device may be implemented as hardware, firmware or software, or some combination of at least two of the hardware, firmware, or software. It should be noted that the functionality associated with any particular controller may be centralized or distributed, whether locally or remotely. Definitions for certain words and phrases are provided throughout this patent document, and those skilled in the art should understood that in many cases, if not most cases, the definitions are applied to the related art as well as the future use of the words and phrases defined as above.

Although the terms including an ordinal number such as first, second, etc. can be used for describing various elements, the structural elements are not restricted by such terms. Rather, the terms are used merely for the purpose of distinguishing an element from other elements. For example, a first element could be termed a second element, and similarly, a second element could be also termed a first element without departing from the scope of the present disclosure.

In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television (TV), a digital versatile disc (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

In accordance with various embodiments of the present disclosure, a user terminal may be an electronic device, as an example.

In embodiments of the present disclosure, for the purpose of explanation, when performing a direct communication of terminals, a terminal that operates at a receiver side is referred to as "a reception terminal" and a terminal that operates at a transmitter side is referred to as "a transmission terminal".

FIG. 1 is a diagram of a cellular communication system to which direct communication between terminals is applied according to an embodiment of the present disclosure.

Referring to FIG. 1, the illustrated communication system includes a base station 108, a relay station 110 and a terminal 112 for transmitting and receiving data to and from the base station 108, a transmission terminal 102 for transmitting and receiving data to and from the relay station 110, a reception terminal 104 for transmitting and receiving data to and from the transmission terminal 102, and a wiretap terminal 106 for wiretapping data transmitted and received to and from the transmission terminal 102 and the reception terminal 104. Here, the wiretap terminal 106 is described as one particular terminal by way of example, but the wiretap terminal 106 may be any terminal of neighboring terminals of the transmission terminal 102.

The transmission terminal 102 transmits data to a predetermined legitimate terminal, that is, the reception terminal 104. However, when wiretapping is attempted by the wiretap terminal 106, which is a neighboring terminal of the reception terminal 104, the data may be received by not only the reception terminal 104 but also the wiretap terminal 106, and in this case, a data security issue can be a problem.

An embodiment of the present disclosure to be described later proposes an error correcting code which makes the reception terminal 104 successfully reconstruct data and the wiretap terminal 106 fail data reconstruction, in order to address the data security problem.

Figure 2:
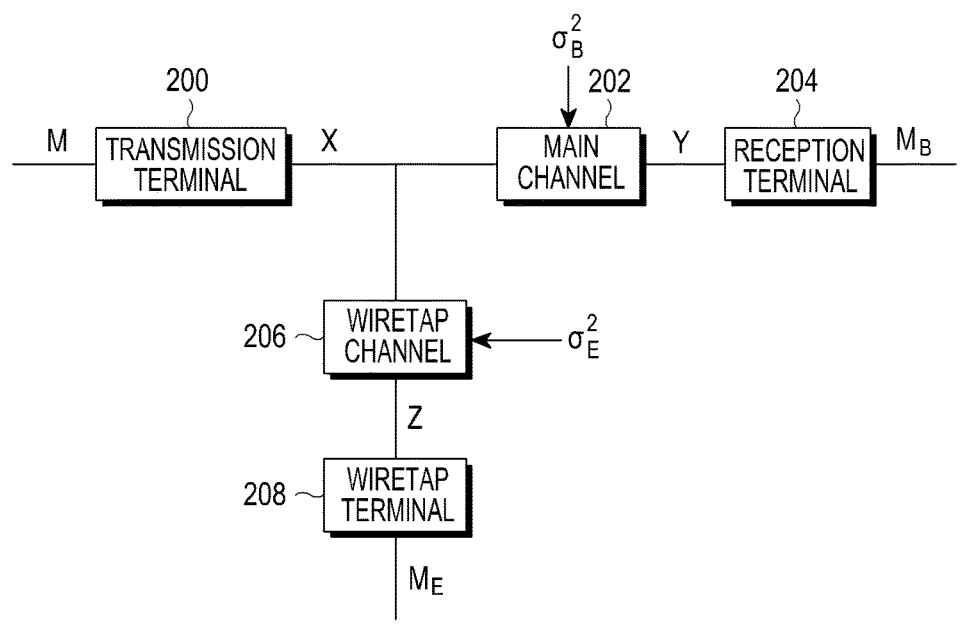
FIG. 2 is a diagram illustrating channels among a transmission terminal, a reception terminal, and a wiretap terminal in a device-to-device (D2D) communication system according to an embodiment of the present disclosure.

FIG. 2 is a diagram illustrating channels between a transmission terminal, a reception terminal, and a wiretap terminal in a device-to-device (D2D) communication system according to an embodiment of the present disclosure.

Referring to FIG. 2, it is assumed that the D2D communication system includes a transmission terminal 200, a reception terminal 204, and a wiretap terminal 208. A channel between the transmission terminal 200 and the reception terminal 204 is defined as a main channel 202, and a channel for wiretapping the main channel 202 is defined as a wiretap channel 206. In addition, the main channel 202 is assumed to have a better channel state than the wiretap channel 206, and at this time, a secrecy channel capacity C between the transmission terminal 200 and the reception terminal 204 may be calculated by Equation 1 as follows. Here, the secrecy channel is a channel for ensuring the security of the data transmitted and received.

$$C = \left\{ \frac{1}{2}\log\left(1 + \frac{P}{\sigma_B^2}\right) - \frac{1}{2}\log\left(1 + \frac{P}{\sigma_E^2}\right) \right\}^+ \qquad \text{Equation 1}$$

That is, the secrecy channel capacity C is calculated by a difference between a main channel capacity and a wiretap channel capacity. In Equation 1, P denotes the received signal power, $\sigma_B^2$ denotes a noise variance of the reception terminal, and $\sigma_E^2$ denotes a noise variance amount of the wiretap terminal.

In order to ensure a secrecy channel capacity C, it should be assumed that a perfect security condition, that is, both security and reliability of data transmitted and received, is satisfied. In order to assume a perfect security condition, as a basis for determining a degree of confusion of the wiretap channel 206, $$\Delta = \frac{1}{k}H(M \mid M_E)$$

information that represents equivocation of the wiretap channel 206 is needed. In addition, in order to assume a perfect security condition, two conditions as follows should be considered. That is, the first condition should be satisfied in order to guarantee the reliability of the data, and the second condition must be satisfied in order to ensure the security of the data.

$$Pr\{M \neq M_B\} < \epsilon, \epsilon \approx 0: \qquad \text{First Condition}$$

$$I(M; M_E) = H(M) - H(M \mid M_E) = 0: \qquad \text{Second Condition}$$

In addition, in order to guarantee perfect security through the first and second conditions, a reception signal-to-noise ratio (SNR) of the reception terminal 204 should be greater than reception SNR of the wiretap terminal 208. That is, only when the reception SNR of the wiretap terminal 208 is lower than the reception SNR of the reception terminal 204, can security of the physical layer be maintained. However, when the reception SNR of the wiretap terminal 208 is higher than the reception SNR of the reception terminal 204, the security should be maintained based on a cryptology of an upper layer.

When assuming that bits 0 and 1 of generated data M are generated with equal probability, a value of uncertainty H(M) of the generated data M becomes one. In addition, when data $M_E$ received by the wiretap terminal 208 has a 0.5 bit error rate (BER), a value of the uncertainty $H(M|M_E)$ of the received data $M_E$ also becomes one. That is, when the second condition for guaranteeing perfect security as mentioned above, that is, the condition of security guarantee is satisfied, this has the same meaning as the BER in a region having a low reception SNR value being 0.5.

In addition, in order to ensure the high reliability of data $M_B$ received by the reception terminal 204, if the BER $Pr\{M \neq M_B\}$ of data $M_B$ received by the wiretap terminal 208 is close to zero, the first condition for guaranteeing the perfect security as described above, that is, the condition of the reliability guarantee is satisfied. This also means that the BER in a region having a high reception SNR value has a value close to zero.

In the illustrated drawing, M denotes data generated by the transmission terminal 200, X denotes data obtained by encoding the data M, and the encoded data X passes through the main channel 202. Y denotes data decoded by the reception terminal 204 after the encoded data X has passed through the main channel 202, and Z denotes data decoded by the wiretap terminal 208 after the encoded data X has passed through the wiretap channel 206. Here, each of the decoded data Y and Z may be used interchangeably with each of $M_B$ and $M_E$.

Hereinafter, an error correcting code for security according to an embodiment of the present disclosure will be described in more detail.

The transmission terminal 200 performs first encryption prior to transmitting the generated data M. As an example, when defining a sequence of the generated data as a vector u, and defining a sequence of encrypted data as a vector m, Equation 2 below is established between the generated data sequence and the encrypted data sequence.

$$m = u \cdot S \qquad \text{Equation 2}$$

S is a matrix for encoding the vector u, and can be configured to be a non-singular matrix in which an inverse matrix is present. In an embodiment of the present disclosure, a matrix S uses a dual diagonal matrix defined by Equation 3 as follows:

$$S = \begin{bmatrix} 1 & 1 & & & \\ & 1 & 1 & & \\ & & \ddots & \ddots & \\ & & & 1 & 1 \\ & & & & 1 \end{bmatrix} \qquad \text{Equation 3}$$

Through a matrix equation of such a dual diagonal matrix S, it may be seen that the encryption of the vector m has been progressed to a value through modulo arithmetic between a bit in a current state and a bit in an immediately previous state.

$$\begin{aligned} m_1 &= u_1 \\ m_2 &= u_1 + u_2 \\ m_3 &= u_2 + u_3 \\ &\vdots \\ m_n &= u_{n-1} + u_n \end{aligned} \qquad \text{Equation 4}$$

In terms of the regularity of Equation 4, the generator polynomial of a dual diagonal matrix S may be defined by Equation 5 as follows:

$$g(D) = 1 + D \qquad \text{Equation 5}$$

The generator polynomial of Equation 5 enables a configuration of a convolution encoder to have one register. "1" in the generator polynomial denotes that an edge is formed with respect to the previous bit based on the register, and D denotes that an edge is formed with respect to a next bit based on the register. Here, the edge denotes that the previous bit of the register is feedforwarded to and input after the register, and as a result, an error correcting code for security according to an embodiment of the present disclosure is determined through performing the modulo arithmetic on the previous bit of the register and the next bit of the register based on the register.

Figure 3:
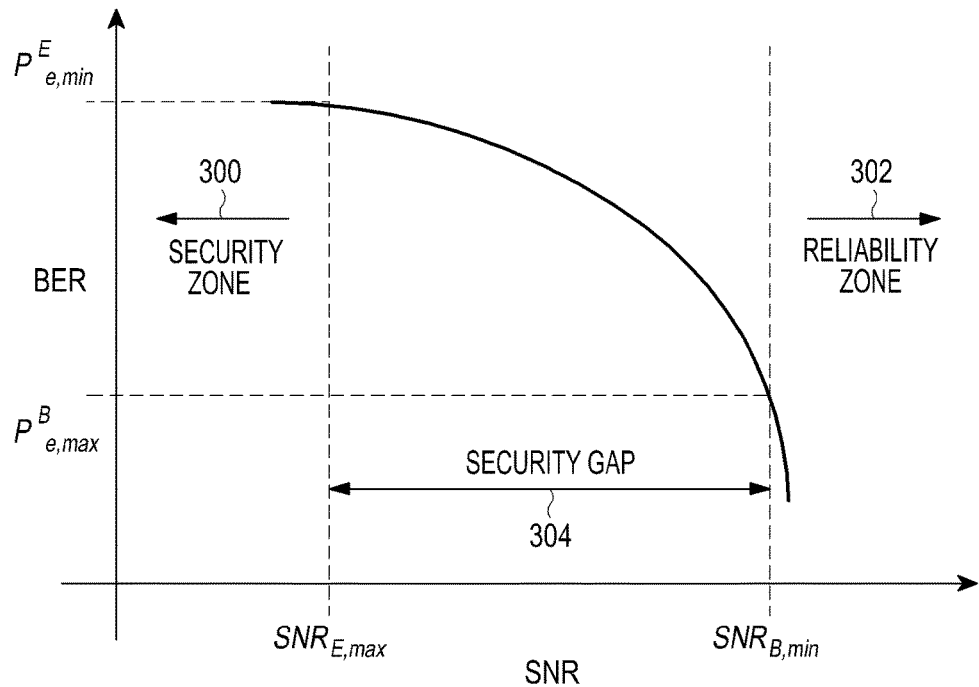
FIG. 3 is a graph illustrating a bit error rate (BER) performance curve and a security gap in a D2D communication system according to an embodiment of the present disclosure.

FIG. 3 is a graph illustrating a BER performance curve and a security gap in a D2D communication system according to an embodiment of the present disclosure.

Referring to FIG. 3, the performance of a BER reference is an indicator of the performance with respect to the security and reliability in a physical layer based security system. A horizontal axis of the illustrated graph represents the reception SNR for each of the reception terminal and the wiretap terminal, and a vertical axis represents BER for each of the reception terminal and the wiretap terminal. In addition, $P_{e,max}^{B}$ denotes the maximum value of the error probability of the reception terminal, and $P_{e,min}^{E}$ denotes the minimum value of the error probability of the wiretap terminal.

A reliability zone 302, in which the reliability of data is guaranteed, is a section having an error rate of $10^{-5}$ based on a BER. A security zone 300, in which the security of data is guaranteed, is a section having an error rate of 0.5 based on the BER.

In addition, a security gap 304 is defined as a difference between an SNR value of the reliability zone 302, that is, $SNR_{B, min}$ which is the SNR value having BER $10^{-5}$, and $SNR_{E, max}$ which is the SNR value having BER 0.5.

Figure 4:
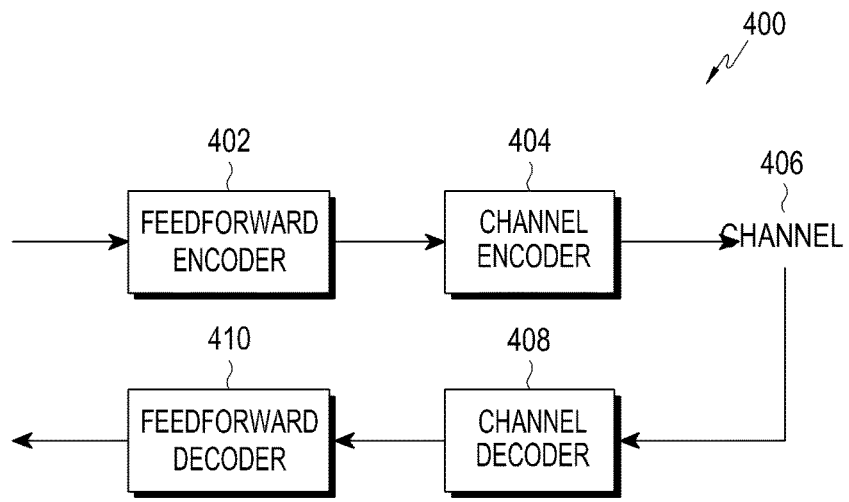
FIG. 4 is a diagram illustrating a structure of a terminal to be applied in a D2D communication system according to an embodiment of the present disclosure.

FIG. 4 is a diagram illustrating a structure of a terminal applied to a D2D communication system according to an embodiment of the present disclosure.

Referring to FIG. 4, a terminal 400 includes a feedforward encoder 402, a channel encoder 404, a channel decoder 408, and a feedforward decoder 410. Here, the channel encoder 404 and channel decoder 408 may be, as an example, a turbo encoder and a turbo decoder, respectively.

When data is input to the feed-forward encoder 402, the terminal 400 encrypts the input data by applying the double diagonal matrix S previously described on the input data, and outputs the encrypted data to the channel encoder 404. The channel encoder 404 outputs final data obtained by encoding the encrypted data through an error correcting code, over a channel 406. Here, the channel may be a main channel, a wiretap channel, etc.

The channel decoder 408 receives the final data received through the main channel, decodes the final data through the error correcting code, and outputs to the feedforward decoder 410. The feedforward decoder 410 decrypts a code of the decoded data, and reconstructs and outputs original data.

Hereinafter, an operation of the feedforward encoder 402 will be described with reference to FIG. 5, and an operation of the feedforward decoder 410 will be described with reference to FIG. 6.

Figure 5:
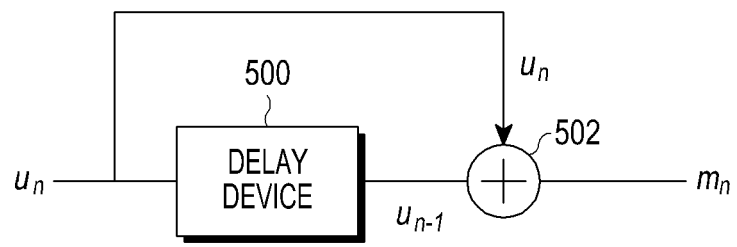
FIG. 5 is a diagram illustrating a feedforward encoder of a terminal to be applied in a D2D communication system according to an embodiment of the present disclosure.

FIG. 5 is a diagram illustrating a feed-forward encoder of a terminal applied to a D2D communication system according to an embodiment of the present disclosure.

Referring to FIG. 5, the illustrated feedforward encoder includes a delay device 500 and a calculator 502. When data vector $u_n$ generated by a transmission terminal is input, the feedforward encoder encrypts the data vector $u_n$, and outputs the encrypted data vector $m_n$. At this time, the feedforward encoder encrypts the data vector $u_n$ in accordance with the generator polynomial of Equation 5 such that the legitimate terminal which is a predetermined reception terminal succeeds in reconstructing data and the wiretap terminal which is not a predetermined terminal fails to reconstruct data. Here, n denotes a data index.

Describing the encryption process in more detail, the feedforward encoder feedforwards the data vector $u_n$ input in the current state next to the delay device 500, and the calculator 502 performs modulo arithmetic on the feedforwarded data vector $u_n$ and a data vector $u_{n-1}$ which has passed through the delay device 500 to generate and output encrypted data vector $m_n$. In the present disclosure, a feedforward encoder of code rate 1 is considered as an example, and here, the code rate 1 means the number of information bits configuring the input data vector $u_n$ is the same as the number of information bits configuring the feedforwarded data vector $u_n$. In addition, data vector $u_{n-1}$ which has passed through the delay device 500 is the same as the data vector input in an immediately preceding state of a current state.

The encrypted data vector $m_n$ output from the feedforward encoder is input to a channel encoder (not shown), and the channel encoder generates and outputs the final code word from the encrypted data vector $m_n$ through an error correcting code. The code word is transmitted over a channel, and the reception terminal and the wiretap terminal receive the code word through a main channel and a wiretap channel, respectively.

Since the feedforward encoder is a kind of turbo encoder using the delay device 500, the feedforward encoder may use a Viterbi algorithm. In addition, a Bahl, Cocke, Jelinel Raviv (BCJR) algorithm has the best performance among decoding algorithms used by the Viterbi algorithm because the BCJR algorithm is maximum a posteriori (MAP) decoding for an error correcting code that is defined by a trellis code. Therefore, the feedforward encoder uses the BCJR algorithm as a decoding algorithm of the feedforward code.

Figure 6:
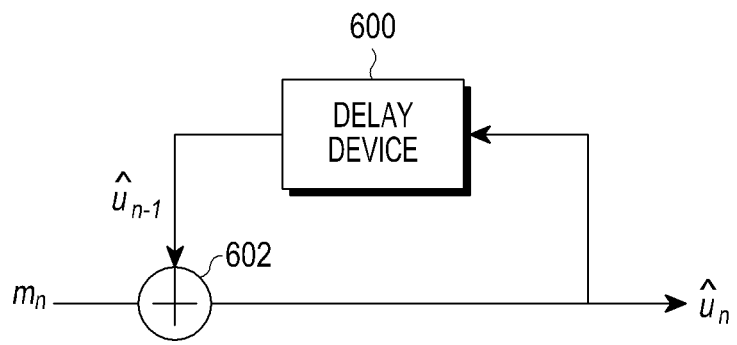
FIG. 6 is a diagram illustrating a hard decision feedforward decoder of a terminal to be applied in a D2D communication system according to an embodiment of the present disclosure.

FIG. 6 is a diagram illustrating a feedforward hard decision decoder of a terminal applied to a D2D communication system according to an embodiment of the present disclosure.

Referring to FIG. 6, the illustrated feedforward hard decision decoder includes a delay device 600 and a calculator 602. The channel decoder (not shown) receives and decodes a code word received from the transmission terminal. At this time, the reception terminal receives the code word through the main channel, and the wiretap terminal receives the code word through the wiretap channel.

Describing the decoding process in more detail, a channel decoder corrects an error that occurs on the channel through a decoding process of an error correcting code used as an inner code. Since the security is to make it impossible to decrypt the encrypted messages for remaining errors after completing an error correction, the remaining errors after completing an error correction are adjusted so as to maximize the decoding failure rate of the wiretap terminal.

The feedforward hard decision decoder performs decoding on the received data vector $m_n$ using final probability information of the decoded data through the error correcting code. That is, the calculator 602 performs modulo arithmetic on data vector $\hat{u}_{n-1}$ decoded in a state immediately preceding the current state and data vector $m_n$ received from the current state vector, and finally generates data vector $\hat{u}_n$ decoded in the current state. In the present disclosure, a feedforward hard decision decoder of code rate 1 is considered as an example, and here, the code rate 1 denotes the number of information bits configuring the input data vector $u_n$ is the same as the number of information bits configuring the feedforwarded data vector $u_n$.

The decoding operation of the calculator 602 can be expressed by Equation 6 as follows:

$$\hat{u}_n = m_n + \hat{u}_{n-1} \qquad \text{Equation 6}$$

Since a multiplication of a generator polynomial and a decryption polynomial in Equation 6 should satisfy $g(D) \cdot g^{-1}(D) = 1$, a decoding polynomial $g^{-1}(D)$ may be defined by Equation 7 as follows:

$$g^{-1}(D) = \frac{1}{1+D} \qquad \text{Equation 7}$$

Since the feedforward decoder structure is a continuously repeating cumulative form of previously decoded data vectors, it can be seen that the error is continuously stacked when an error occurs at one place, and finally an error propagation phenomenon occurs. On the other hand, the error propagation phenomenon may occur in a predetermined legal terminal. In other words, when one residual error occurs in a legitimate terminal, the error is continuously accumulated in the terminal, and the error propagation is generated.

Therefore, the feedforward decoder uses a soft decision decoding scheme rather than a hard decision decoding scheme to reduce such an error propagation phenomenon. That is, the feedforward decoder decodes a value according to the soft decision decoding scheme through a feedforward decoder of code rate 1.

Figure 7:
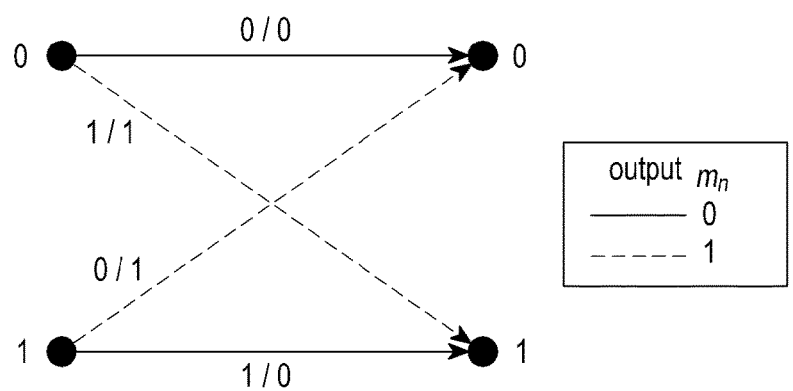
FIG. 7 is a diagram showing a soft decision decoder of feedforward code of code rate 1 to be applied in a D2D communication system, as a trellis diagram, according to an embodiment of the present disclosure.

FIG. 7 is a diagram showing a feedforward soft decision decoder of code rate 1 to be applied in a D2D communication system, as a trellis diagram, according to an embodiment of the present disclosure.

Referring to FIG. 7, according to whether a value of the previous state is 0 or 1, the signal input to the feedforward soft decision decoder moves to a state having a value of 0 or 1 in a next state of the previous state. A BCJR algorithm uses symbol detection for all symbols. That is, the BCJR algorithm not only uses a probability value of a symbol in the current state, but also uses both a probability value of a symbol accumulated until the previous state, the probability value of the symbol in the current state, and probability values stored from the final state to the current state. The BCJR algorithm selects a probability at which the probability value in the current state is maximized through the three kinds of probability values to determine the final value.

Figure 8:
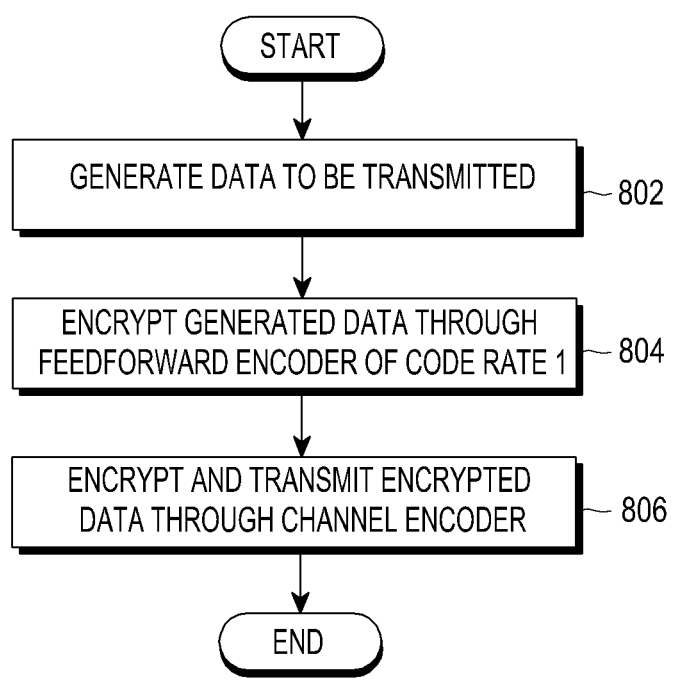
FIG. 8 is a flowchart illustrating an encoding operation of a terminal to be applied in a D2D communication system according to an embodiment of the present disclosure.

FIG. 8 is a diagram illustrating an encoding operation of a terminal to be applied in a D2D communication system according to an embodiment of the present disclosure.

Referring to FIG. 8, the terminal generates data to be transmitted in operation 802, and encrypts the generated data through a feedforward encoder of code rate 1 in operation 804. The feedforward encoder of code rate 1 encrypts data such that a predetermined legitimate terminal succeeds in reconstructing data and the wiretap terminal which is not a predetermined legitimate terminal fails to reconstruct data. The encryption process of the feedforward encoder of the code rate 1 has been described with reference to FIG. 5 above, and here, the detailed description thereof is omitted.

In operation 806, the terminal encodes the encrypted data through the channel encoder, generates the final data, and transmits the generated final data. Here, the channel encoder may be a turbo encoder, as an example.

It is obvious that some of operations 802 to 806 described in FIG. 8 may be changed according to a usage example.

Figure 9:
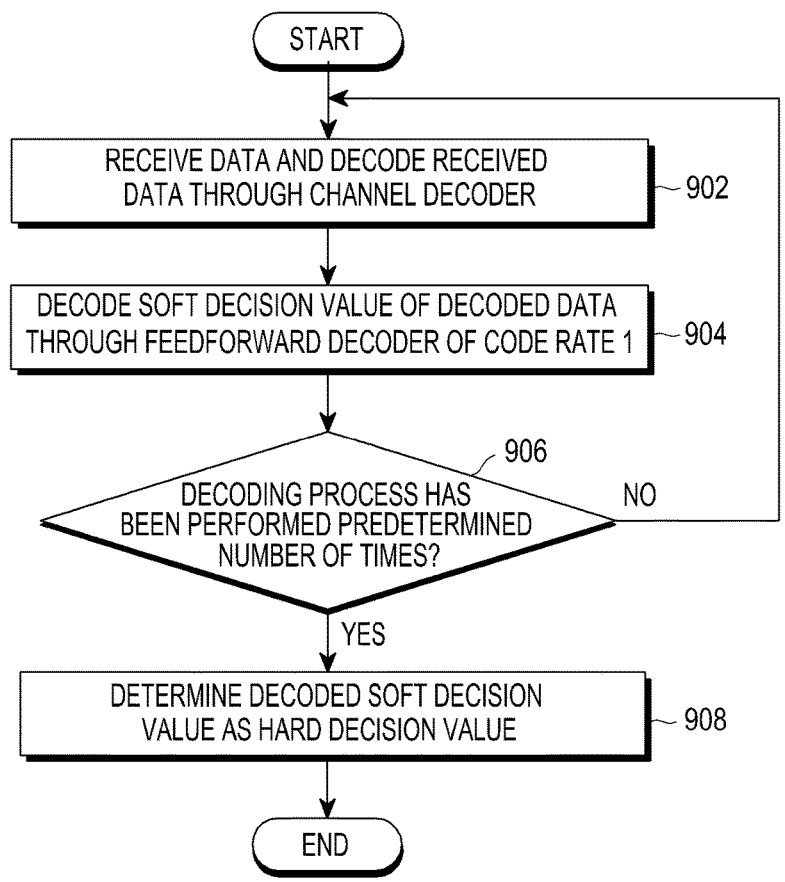
FIG. 9 is a flowchart illustrating a decoding operation of a terminal to be applied in a D2D communication system according to an embodiment of the present disclosure.

FIG. 9 is a flowchart illustrating a decoding operation of a terminal to be applied in a D2D communication system according to an embodiment of the present disclosure.

Referring to FIG. 9, the terminal receives data in operation 902, and decodes the received data through the channel decoder. In operation 904, the terminal decodes a soft decision value of the decoded data through the feedforward decoder of code rate 1, and then proceeds to operation 906.

In operation 906, the terminal identifies whether the decoding process has been performed a predetermined number of times, and when the decoding process has not been performed the predetermined number of times, the process proceeds to operation 902. On the other hand, if the decoding process has been performed the predetermined number of times, the process proceeds to operation 908 to determine a soft decision value of the decoded data as a hard decision value.

It is obvious that some of operations 902 to 908 described in FIG. 9 may be changed according to a usage example.

Figure 10A:
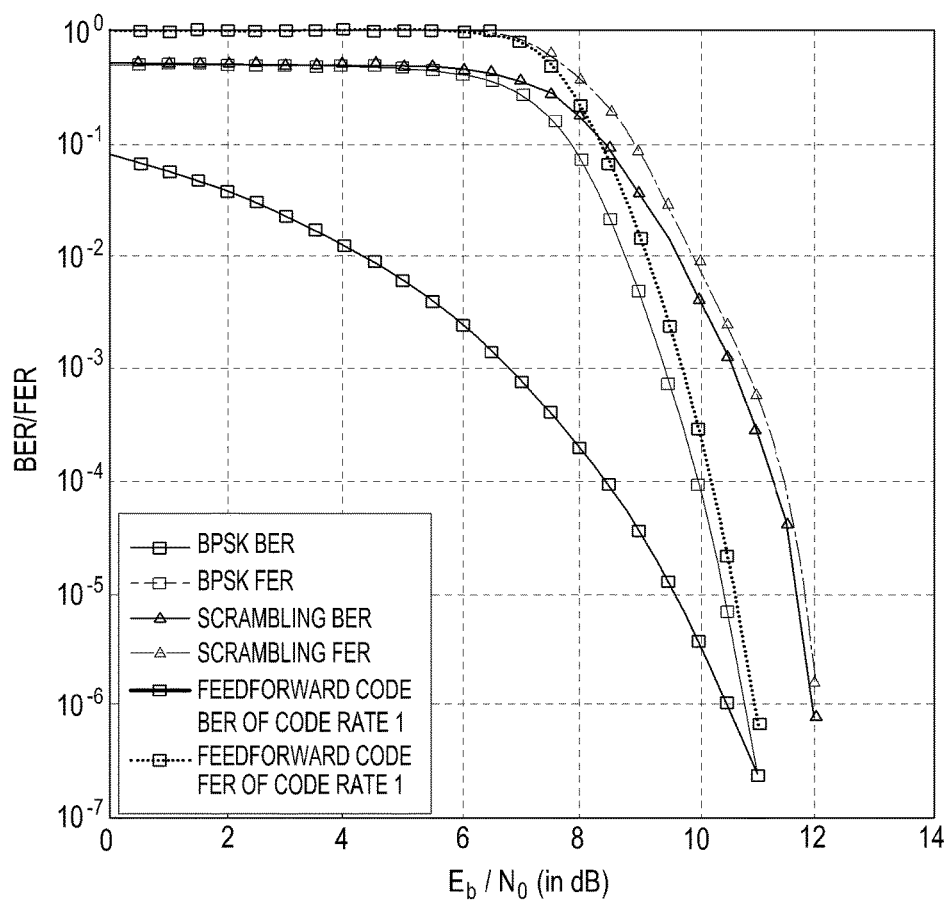
FIG. 10A is a graph illustrating a BER/frame error rate (FER) performance comparison between a binary phase shift keying scheme, a scrambling scheme, and a feedforward coding scheme of code rate 1, when data transmitted by a terminal to be applied in a D2D communication system is 2364 bits, according to an embodiment of the present disclosure.

FIG. 10A is a graph illustrating a BER/frame error rate (FER) performance comparison between a binary phase shift keying (BPSK) scheme, a scrambling scheme, and a feedforward coding scheme of code rate 1, when data transmitted by a terminal to be applied in a D2D communication system is 2364 bits, according to an embodiment of the present disclosure.

Referring to FIG. 10A, a horizontal axis represents an SNR and a vertical axis represents a BER/FER. Looking at a performance curve, both a feedforward code scheme of code rate 1 and a scrambling scheme in a low SNR region has a value of BER 0.5 which guarantees the security. In addition, as an SNR region is higher, BER performance of the feedforward code scheme of a code rate 1 converges to the BER performance of the BPSK modulation scheme.

That is, the feedforward code scheme of code rate 1 shows a result that satisfies the reliability in a high SNR region and ensures the security in the low SNR region at the same time. In addition, it can be seen that the feedforward code scheme of code rate 1 shows a performance enhancement of about 1 dB based on the BER as compared to the scrambling scheme, and has a much better performance, based on the FER side, than the scrambling scheme or the BPSK modulation scheme.

Figure 10B:
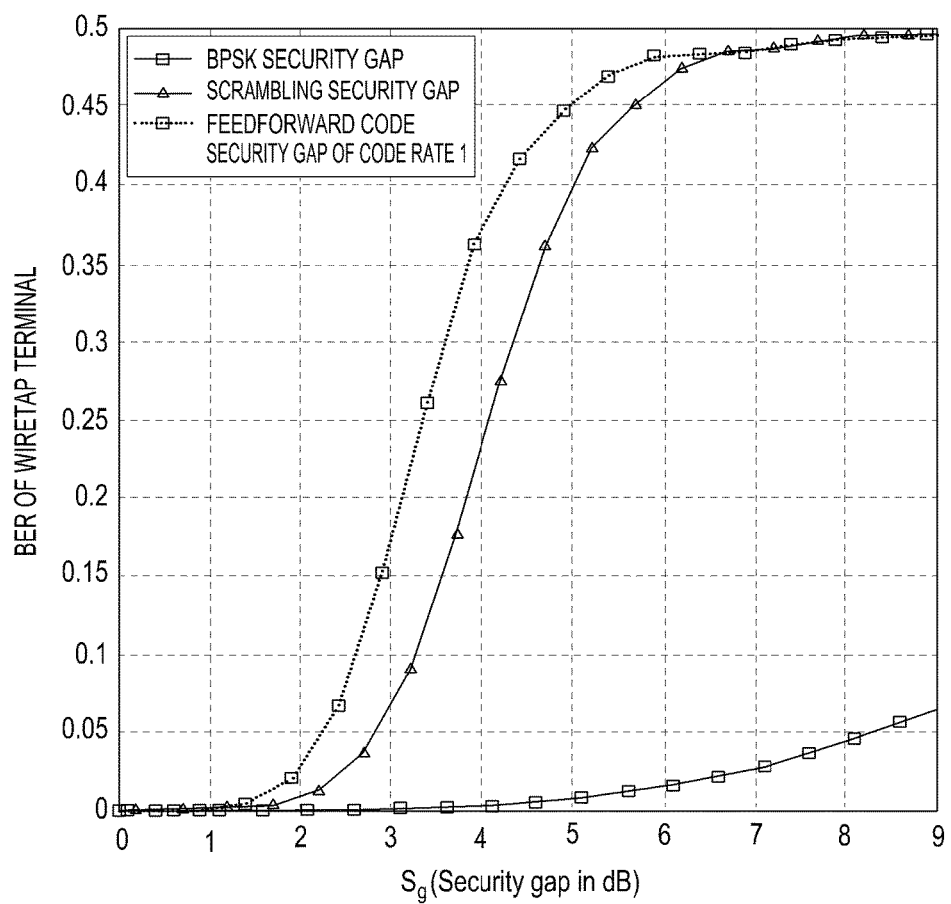
FIG. 10B is a graph illustrating a security gap performance comparison between a binary phase shift keying scheme, a scrambling scheme, and a feedforward coding scheme of code rate 1, when data transmitted by a terminal to be applied to a D2D communication system is 2364 bits, according to an embodiment of the present disclosure.

FIG. 10B is a graph illustrating a security gap performance comparison between a binary phase shift keying scheme, a scrambling scheme, and a feedforward coding scheme of code rate 1, when data transmitted by a terminal to be applied to a D2D communication system is 2364 bits, according to an embodiment of the present disclosure.

Referring to FIG. 10B, a horizontal axis represents a security gap and a vertical axis represents a BER of a wiretap terminal. Looking at a performance curve, a performance of the feedforward code scheme of code rate 1 based on (relative to) BER 0.4 of the wiretap terminal has a security gap gain of about 0.8 dB compared to the scrambling scheme.

In addition, it can be identified that the feedforward code scheme of code rate 1 based on BER 0.4 of the wiretap terminal has a security gap of about 4.2 dB, and the scrambling scheme has a security gap of about 5 dB. This indicates that, when using the feedforward code scheme of the code rate 1, channel states of the reception terminal and the wiretap terminal should have a difference about 4.2 dB compared to the reception SNR so as to have perfect security, and when using the scrambling scheme, channel states of the reception terminal and the wiretap terminal should have a difference about 5 dB compared to the reception SNR so as to have perfect security.

Figure 11A:
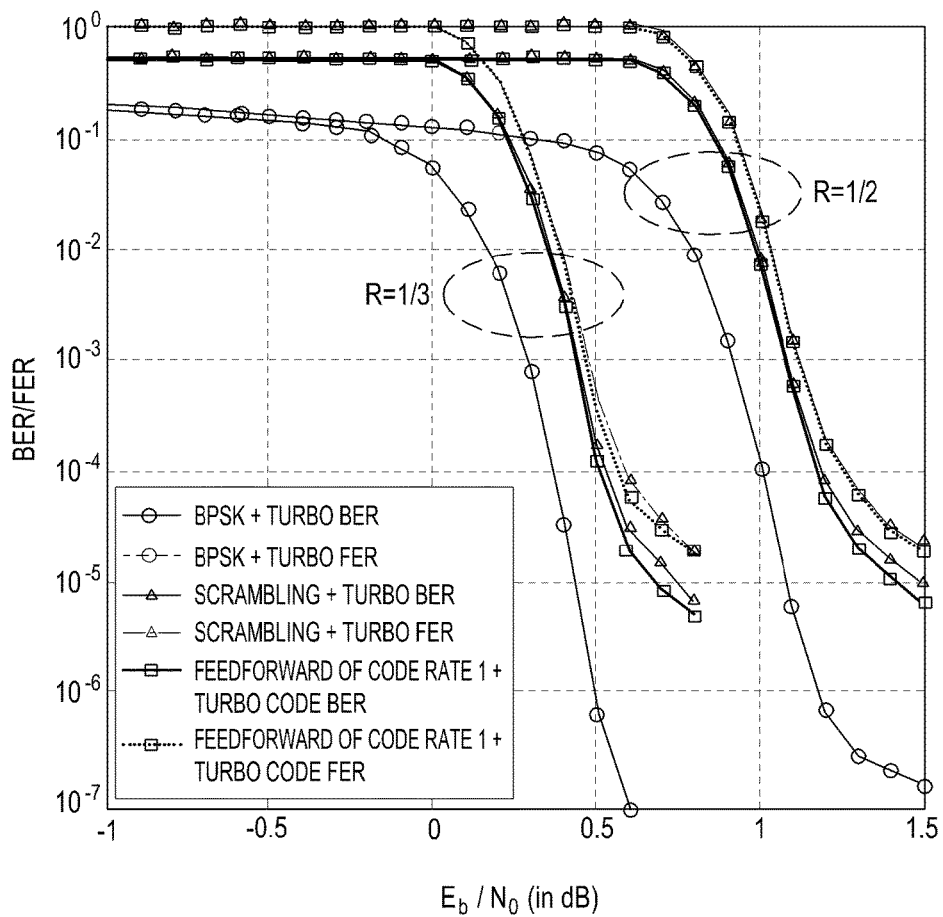
FIG. 11A is a graph illustrating a BER/FER performance comparison between a binary phase shift keying and turbo code scheme, a scrambling and turbo code scheme, and a code rate 1 feedforward code and turbo code scheme, when data transmitted by a terminal to be applied in a D2D communication system is 6144 bits, according to an embodiment of the present disclosure.

FIG. 11A is a graph illustrating a BER/FER performance comparison between a binary phase shift keying scheme and a turbo code scheme, a scrambling and turbo code scheme, and a code rate 1 feedforward code and turbo code scheme, when data transmitted by a terminal to be applied in a D2D communication system is 6144 bits according to an embodiment of the present disclosure.

FIG. 11A assumes a case of using a turbo code as an inner code and setting the number of iterations to eight times, and shows a performance degree due to changes in a coding rate through puncturing by dividing code rate $R=\frac{1}{3}$ and a code rate $R=\frac{1}{2}$. In addition, in FIG. 11A, a horizontal axis represents an SNR and a vertical axis represents a BER/FER.

It can be seen that a code rate 1 feedforward code and turbo code scheme, i.e. an error correcting code in which a turbo code is concatenated to the feedforward code of code rate 1 has a performance gain of about 0.05 to 0.1 dB compared to a scrambling and turbo code scheme, i.e., an error correcting code in which a turbo code is concatenated to the scrambling code.

Figure 11B:
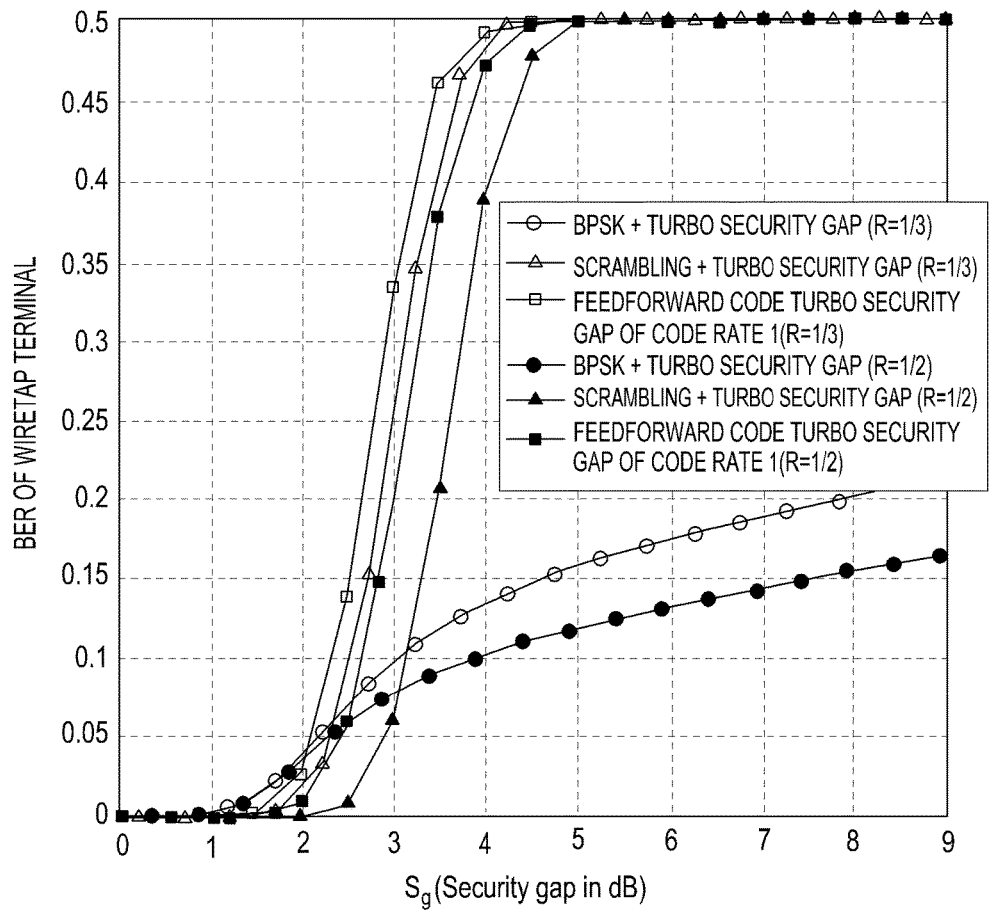
FIG. 11B is a graph illustrating a security gap performance comparison between a binary phase shift keying and turbo code scheme, a scrambling and turbo code scheme, and a code rate 1 feedforward code and turbo code scheme, when data transmitted by a terminal to be applied in a D2D communication system is 6144 bits according to an embodiment of the present disclosure.

FIG. 11B is a graph illustrating a security gap performance comparison between a binary phase shift keying and turbo code scheme, a scrambling and turbo code scheme, and a code rate 1 feed-forward code and turbo code scheme, when data transmitted by a terminal to be applied in a D2D communication system is 6144 bits according to an embodiment of the present disclosure.

Referring to FIG. 11B, a horizontal axis represents a security gap and a vertical axis represents a BER of a wiretap terminal. In addition, FIG. 11B illustrates a case of dividing a security gap performance degree of a corresponding scheme into a code rate $R=\frac{1}{3}$ and a code rate $R=\frac{1}{2}$.

When assuming the code rate is $\frac{1}{2}$, it can be seen that a code rate 1 feedforward code and turbo code scheme, i.e. an error correcting code in which a turbo code is concatenated to the feedforward code of code rate 1 has a performance gain of about 0.1 dB compared to a scrambling and turbo code scheme, i.e., an error correcting code in which a turbo code is concatenated to the scrambling code.

An apparatus and method for generating an error correcting code for security according to an embodiment of the present disclosure can be realized in a form of hardware, software, or a combination of hardware and software. Any such software may be stored, for example, in a volatile or non-volatile storage device such as a read-only memory (ROM), a memory such as a random access memory (RAM), a memory chip, a memory device, or a memory integrated circuit (IC), or a recordable optical or magnetic medium such as a compact disc (CD), a DVD, a magnetic disk, or a magnetic tape, regardless of its ability to be erased or its ability to be re-recorded. A web widget manufacturing method of the present disclosure can be realized by a computer or a portable terminal including a controller and a memory, and it can be seen that the memory corresponds to an example of the storage medium which is suitable for storing a program or programs including instructions by which the embodiments of the present disclosure are realized, and is machine readable.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

In addition, an apparatus for generating an error correcting code for security according to an embodiment of the present disclosure may also receive and store a program from a program providing apparatus connected by wired or wireless communication. The program supply apparatus may include a program that includes instructions to execute the various embodiments of the present disclosure, a memory that stores information or the like required for the various embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for encrypting data of a transmission terminal in a near field communication system, the method comprising:
   receiving, by at least one processor of the transmission terminal, first data;
   generating, by the at least one processor, second data by delaying the first data;
   generating, by the at least one processor, encrypted data based on the first data and the second data;
   encoding, by the at least one processor, the encrypted data through a predetermined error correcting code; and
   transmitting, by the at least one processor, the encoded data,
   wherein a capacity of a secrecy channel for ensuring security of the transmitted data is calculated by a difference between a capacity of a main channel and a capacity of a wiretap channel,
   wherein the main channel comprises a channel between the transmission terminal and a reception terminal and the wiretap channel comprises a channel between the transmission terminal and a wiretap terminal other than the reception terminal, and
   wherein the capacity of the secrecy channel is calculated based on a received signal power, a noise variance of the reception terminal, and a noise variance of the wiretap terminal.

2. The method of claim 1, further comprising:
   performing modulo arithmetic on the first data and the second data.

3. The method of claim 1, wherein the first data is feedforwarded so as to have a code rate of 1.

4. The method of claim 1, further comprising:
   determining that the capacity of the secrecy channel is secured, if a first condition for ensuring the reliability of the transmitted data is satisfied and a second condition for ensuring the security of the transmitted data is satisfied, the first condition and the second condition being:

$Pr\{M \neq M_B\} < \epsilon, \epsilon \approx 0:$  First Condition $I(M;M_E) = H(M) - H(M|M_E) = 0:$  Second Condition wherein, M denotes the first data, $M_B$ denotes data received by the reception terminal, $Pr\{M \neq M_B\}$ denotes that a probability of M and $M_B$ are not the same, $M_E$ denotes data received by the wiretap terminal, and $H(M)$ denotes uncertainty of M, and $H(M|M_E)$ denotes uncertainty of $M_E$.

5. A transmission terminal for encrypting data in a near field communication system, the transmission terminal comprising:
   a transceiver; and
   at least one processor configured to:
      control the transceiver to receive a first data,
      generate second data by delaying the first data,
      generate encrypted data based on the first data and second data,
      encode the encrypted data through a predetermined error correcting code, and
      control the transceiver to transmit the encoded data,
   wherein a capacity of a secrecy channel for ensuring security of the transmitted data is calculated by a difference between a capacity of a main channel and a capacity of a wiretap channel,
   wherein the main channel comprises a channel between the transmission terminal and a reception terminal and the wiretap channel comprises a channel between the transmission terminal and a wiretap terminal other than the reception terminal, and
   wherein the capacity of the secrecy channel is calculated based on a received signal power, a noise variance of the reception terminal, and a noise variance of the wiretap terminal.

6. The transmission terminal of claim 5, wherein the at least one processor is further configured to perform modulo arithmetic on the first data and the second data.

7. The transmission terminal of claim 6, wherein the first data is feedforwarded to the calculator so as to have a code rate of 1.

8. The transmission terminal of claim 5, wherein the capacity of the secrecy channel is secured, if a first condition for ensuring the reliability of the transmitted data is satisfied and a second condition for ensuring the security of the transmitted data is satisfied, the first condition and the second condition being:

$Pr\{M \neq M_B\} < \epsilon, \epsilon \approx 0:$  First Condition $I(M;M_E) = H(M) - H(M|M_E) = 0:$  Second Condition wherein, M denotes the first data, $M_B$ denotes data received by the reception terminal, $Pr\{M \neq M_B\}$ denotes that a probability of M and $M_B$ are not the same, $M_E$ denotes data received by the wiretap terminal, and $H(M)$ denotes uncertainty of M, and $H(M|M_E)$ denotes uncertainty of $M_E$.

* * * * *